Aug. 18, 1964    H. P. WRIGHT    3,145,355
VARIABLE ULTRASONIC DELAY LINE
Filed Sept. 20, 1961    2 Sheets-Sheet 1

INVENTOR.
HOLDEN P. WRIGHT
BY
Philip J. McFarland
ATTORNEY

Aug. 18, 1964   H. P. WRIGHT   3,145,355
VARIABLE ULTRASONIC DELAY LINE
Filed Sept. 20, 1961   2 Sheets-Sheet 2

INVENTOR.
HOLDEN P. WRIGHT
BY
Philip J. McFarland
ATTORNEY

United States Patent Office
3,145,355
Patented Aug. 18, 1964

3,145,355
VARIABLE ULTRASONIC DELAY LINE
Holden P. Wright, Bolton, Conn., assignor to Laboratory for Electronics, Inc., Boston, Mass., a corporation of Delaware
Filed Sept. 20, 1961, Ser. No. 139,454
3 Claims. (Cl. 333—30)

This invention pertains generally to solid ultrasonic delay lines and particularly to improved lines of such type in which the delay time may be varied.

In known variable ultrasonic delay lines, delay time is varied by varying the length of the path of acoustic energy in an homogeneous acoustic transmitting medium. In such devices the required change in the path of the acoustic energy between a transmitting transducer and a receiving transducer may be accomplished in many different ways. For example, the variable lines disclosed and described by Johnson in U.S. Patent #2,659,053, by Arenberg in U.S. Patent #2,703,867 and by Lockhart in the co-pending application Serial No. 113,937, filed May 31, 1961, and assigned to the same assignee as this application, all show different ways in which variation of path length in a homogeneous medium may be accomplished to effect variations in delay time in a solid ultrasonic delay line.

While variable delay lines according to any of the cited references are satisfactory, a need exists for variable delay lines specifically adapted to different purposes than any such lines. That is, a need exists for a variable ultrasonic delay line which is both simple and compact yet adapted to precise adjustment over a given range of delay times.

Therefore it is an object of this invention to provide a solid variable ultrasonic delay line in which the path length of acoustic energy in the acoustic transmitting medium is substantially fixed regardless of the amount of delay.

Another object of the invention is to provide a solid variable ultrasonic delay line utilizing an acoustic transmitting medium in which the average velocity of acoustic energy varies as a function of the position of the path of such energy.

Still another object of the invention is to provide a simple and compact ultrasonic delay line which accomplishes the foregoing objects.

These and other objects of the invention are attained generally by providing an acoustic transmitting medium in which the average velocity of acoustic energy varies as a linear function of the path of acoustic energy in such a medium, a transmitting and a receiving acoustic transducer, means for coupling the two transducers to the acoustic transmitting medium, and means for simultaneously adjusting the position of the two transducers with respect to the acoustic transmitting medium so that the transit time of acoustic energy between the two and through the transmitting medium may be varied.

For a more complete understanding of the invention reference is now made to following detailed description of an embodiment of the invention illustrated in the drawing, in which.

Figure 1:
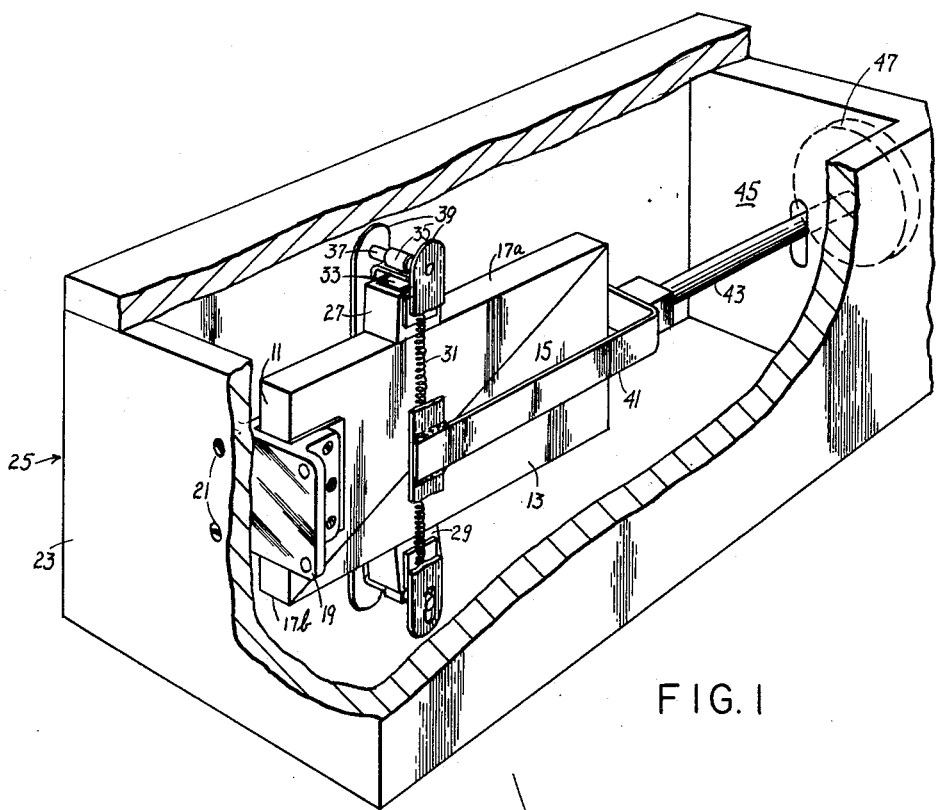
FIG. 1 is a perspective view, partially cut away and simplified, of a solid variable delay line according to the invention.

Referring now to FIG. 1, it may be seen that the illustrated delay line proper consists of a block 11 of a first acoustic transmitting material, as fused quartz, and a second block 13 of a second acoustic transmitting material, as glass. The two blocks 11, 13 preferably are each ground, or otherwise finished, to the shape of a right pyramid, and then cemented together as with a bond of phenyl benzoate to form an interface 15. At the same time, such a cementing step joins the two blocks 11, 13 into an integral assembly which is a parallelepiped having opposite parallel surfaces 17a, 17b. A bracket 19, which may be clamped in any known manner to block 11, is attached, as by a plurality of screws 21 (only two of which are shown) to an end wall 23 of a case 25. An acoustic coupler 27, preferably fabricated from the same material as the block 11, is mounted on surface 17a. An acoustic coupler 29, preferably formed of the same material as block 13, is mounted on surface 17b. In passing, it is noted that any known unctuous material may be placed on surfaces 17a and 17b to improve the mechanical and acoustical properties of the joint between the acoustic couplers 27, 29 and their respective mounting surfaces. The acoustic couplers 27 and 29 held in intimate contact with the surfaces 17a, 17b by means of a pair of springs 31 (only one of which is shown) disposed so as to exert a force tending to pull the couplers 27, 29 together. An acoustic transducer 33 is mounted on the acoustic coupler 27 and another acoustic transducer (not shown) is mounted on acoustic coupler 29. Positioning of the acoustic couplers 27, 29 and the acoustic transducers attached to each of these elements is here accomplished by the illustrated mechanical arrangement although the particular arrangement is not critical. As illustrated, the acoustic coupler 27 is connected by a bracket 35 to a rod 37 which in turn fits into slotted members 39 and the acoustic coupler 29 is similarly connected to the slotted members 39 except that the rod 37 associated with acoustic coupler 29 is fitted into the slots (not numbered) in the slotted members 39. A fork 41 is attached to the slotted members 39, as by welding, so that the longitudinal axis of the fork 41 is substantially parallel to the longitudinal axis of the parallelepiped formed by the two blocks 11, 13. A rod 43 in turn is attached to the fork 41, extending outwardly therefrom through an elongated opening (not numbered) in an end wall 45 of the case 25 opposite to the end wall 23. A knob 47, shown in phantom in FIG. 1, is affixed to the free end of the rod 43. Consequently if the knob 47 is pressed toward or moved away from the end wall 45, the acoustic couplers 27, 29 (and the acoustic transducers) are moved together along the surfaces 17a, 17b. On the other hand, if the knob 47 is moved up or down so that the rod 43 moves in the elongated opening in the end wall 45 the acoustic couplers 27, 29 are moved relative to each other.

Figure 2:
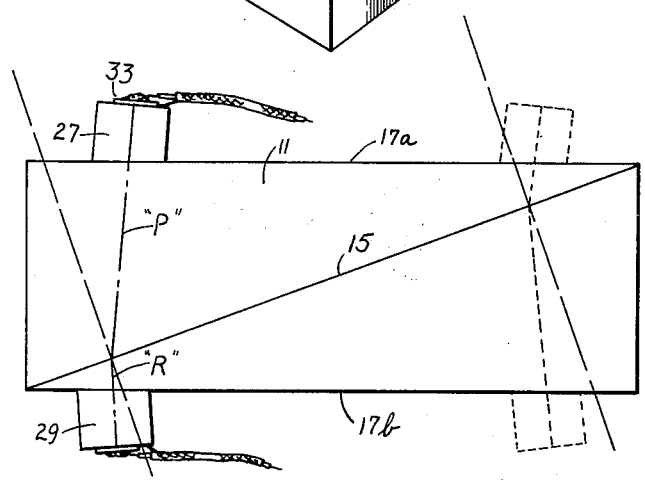
FIG. 2 is a schematic representation of the path of acoustic energy in a delay line such as is illustrated in FIG. 1; and, FIG. 3 is a perspective view, partially cut away and simplified, of a second embodiment of the invention.

The operation of the delay line just described is best explained by reference to FIG. 2. Thus, let it be assumed that acoustic transducer 33 transmits acoustic energy and the acoustic transducer (not numbered) on the surface of the acoustic coupler 29 receives such energy. In accordance with normal practice the couplers 27, 29 are so shaped that acoustic energy impinges normally on the receiver transducer. In the illustrated case this end is accomplished by inclining the surfaces on which the acoustic transducers are mounted equally with respect to surfaces 17a and 17b. While such equal inclination of the transducer mounting surfaces obviously simplifies manufacture of the couplers (since the same tooling may be used to make both acoustic couplers 27, 29) such inclination is not essential. It is necessary only that each of the acoustic couplers 27, 29 be so shaped that, in the case of acoustic coupler 27, acoustic energy is propagated in a direction perpendicular to the surface upon which the acoustic transducer 33 is mounted and, in the case of acoustic coupler 29, that the beam of acoustic energy impinge normally to the acoustic transducer mounted thereon and that the angle at which the acoustic energy impinges on the interface 15 be greater than the critical angle of such interface. When the acoustic transducer 33 is energized, as by applying an electric signal through the un-numbered leads attached thereto, acoustic energy is propagated in a beam as indicated by the broken line marked "P" passing through the acoustic coupler 27 and the block 11 until it strikes the interface 15. At the interface 15 the acoustic energy is refracted and passes through the block 13 along the path marked "R" and thence through the acoustic coupler 29 to energize the acoustic transducer mounted thereon and producing a delayed electric signal. If it is desired to change the delay time, in other words to change the time taken for acoustic energy to pass from the transmitting transducer to the receiving transducer the acoustic couplers 27, 29 are moved along the surfaces 17a, 17b as described hereinbefore, say to the positions marked in phantom in FIG. 2. It is obvious from the figure that when the acoustic couplers 27, 29 are moved the physical distance through which acoustic energy must travel to pass from the transmitting to the receiving transducer is substantially constant. The time taken for such a trip is greater when the transducers are moved to the right as illustrated for the reason that when the transducers are so moved a greater portion of the distance travelled by the acoustic energy is in material in which acoustic energy is more slowly propagated. In other words, the average velocity of the energy in the acoustic transmitting medium is decreased when the acoustic couplers are moved to the right.

Figure 3:
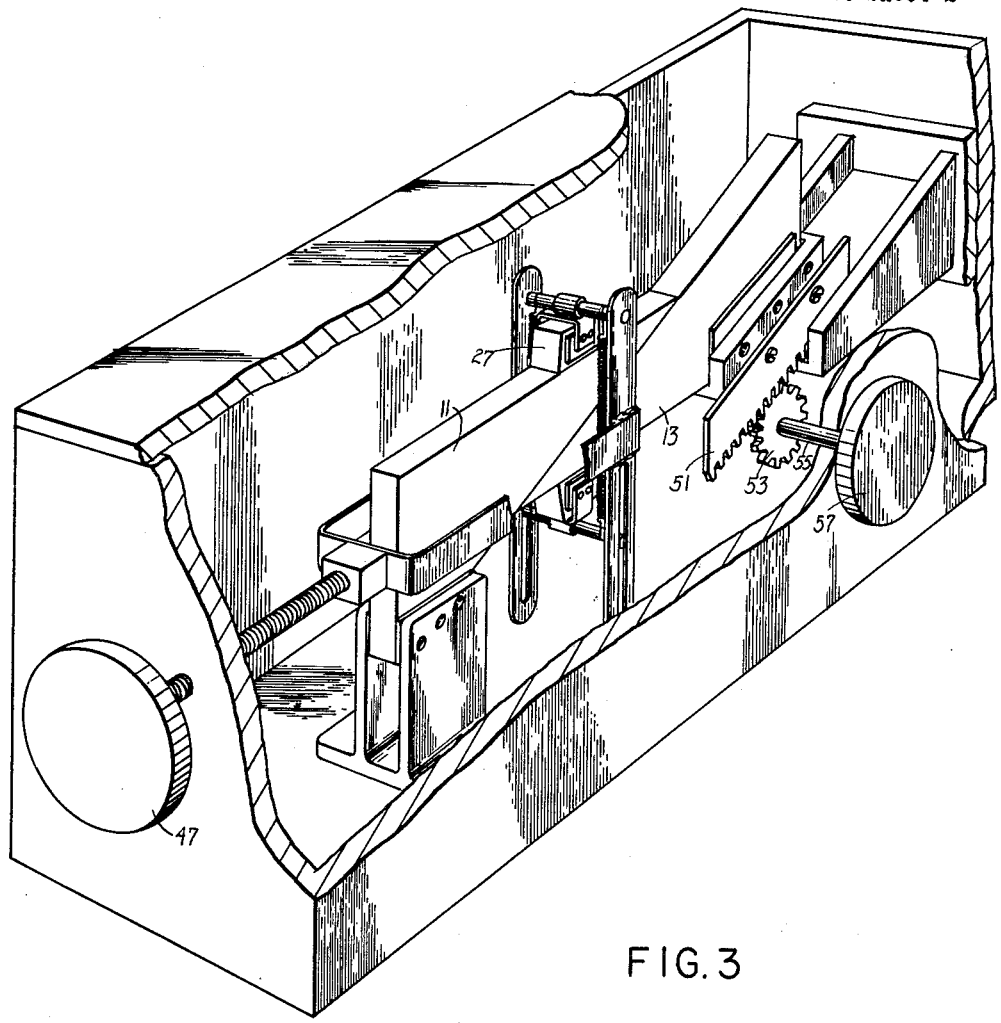

Referring now to FIG. 3 it will be noted first that the means for adjusting the position of the acoustic couplers 27, 29 may be substantially identical with that described in connection with FIG. 1. The major difference between the embodiment illustrated in FIG. 3 and FIG. 1 derives from the fact that the blocks 11, 13 in the embodiment illustrated in FIG. 3 are movable with respect to each other. Such movement may be accomplished by mounting a rack 51 on the block 13 and meshing rack 51 with a pinion 53 drivable by an operating knob 57 through a shaft 55. The line of rack 51 is held parallel to the interface 15 as by a guide (not numbered). Thus, as knob 57 is rotated, block 13 is caused, through the intermediate gearing just described, to slide along the opposing surface of block 11 and the amount of acoustic transmitting material between the transmitting and receiving acoustic transducers is varied to change the range of delay times possible. After the range of possible delay has been set, any delay in the range may be set by moving the acoustic couplers 27, 29 (and the acoustic transducers) as previously described in connection with FIG. 1. Obviously in this embodiment provision may be made, if desired, to compensate for position of acoustic transducer in the same manner as described in connection with FIG. 1 and an unctuous material may be placed on the opposing surfaces of block 11 and block 13.

Many modifications of the illustrated embodiments of the invention will become immediately apparent to those having skill in the art. For example, it obviously is not necessary that the blocks 11, 13 be pyramidal or that when they are placed in juxtaposition that they form a parallelepiped. The blocks 11, 13 may be formed into any desired shape, so long as when they are placed together to form an acoustic transmitting medium the average velocity of acoustic energy in such a medium varies as a function of the particular path of the acoustic energy therein. Further, it is obvious that the material from which the acoustic couplers 27, 29 are fabricated need not be the same as the material of the blocks 11, 13, nor need the materials of the blocks 11, 13 themselves be restricted to those materials specifically mentioned. In other words, the shape and material of the various elements may be changed as desired within wide limits.

In view of the foregoing description and obvious modifications of the invention, it is felt that the invention should not be limited to the illustrated embodiments thereof but rather should be limited only by the spirit and scope of the appended claims.

What is claimed is:

1. A solid variable ultrasonic delay line comprising an acoustic transmitting medium consisting of a first and a second generally wedge-shaped element disposed in intimate contact with each other to form a parallelepiped having an inclined interface formed therein and a pair of parallel opposing surfaces, the velocity of propagation of acoustic energy in the first wedge-shaped element being different from the velocity of propagation of acoustic energy in the second wedge-shaped element, a transmitting and a receiving acoustic transducer, and means for slidably mounting the transmitting and receiving acoustic transducer respectively on separate ones of the pair of parallel opposing surfaces whereby acoustic energy from the transmitting transducer is coupled to the acoustic transmitting medium, refracted at the interface therein and directed to the receiving transducer, the time taken being a function of the position of the transmitting and the receiving transducer on the parallel opposing surfaces.

2. A solid variable ultrasonic delay line as in claim 1 wherein the transmitting transducer and the receiving transducer are each inclined to the acoustic transmitting medium so that acoustic energy impinges normally on the receiving transducer.

3. A solid variable ultrasonic delay line as in claim 2 having in addition means for independently adjusting the position of the transmitting transducer and the receiving transducer with respect to each other as the two are moved along the acoustic transmitting medium.

References Cited in the file of this patent
UNITED STATES PATENTS

| | | |
|---|---|---|
| 2,247,051 | Chilowsky et al. | June 24, 1941 |
| 2,602,101 | Mesh | July 1, 1952 |
| 2,659,053 | Johnson | Nov. 10, 1953 |
| 2,672,590 | McSkimin | Mar. 16, 1954 |
| 2,703,867 | Arenberg | Mar. 8, 1955 |
| 2,996,687 | Wright | Aug. 15, 1961 |